United States Patent
Oberlander

(10) Patent No.: US 6,702,948 B1
(45) Date of Patent: Mar. 9, 2004

(54) MOBILE DIESEL FUEL ENHANCEMENT UNIT AND METHOD

(75) Inventor: James E. Oberlander, Hollywood, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/231,943

(22) Filed: Aug. 30, 2002

(51) Int. Cl.[7] .......................... B01D 29/56; B01D 35/02
(52) U.S. Cl. .................... 210/748; 210/85; 210/167; 210/222; 210/223; 210/416.4
(58) Field of Search ...................... 210/748, 85, 143, 210/167, 222, 223, 416.1, 416.4

(56) References Cited

U.S. PATENT DOCUMENTS

| | | | | |
|---|---|---|---|---|
| 3,131,751 A | * | 5/1964 | Twibell | 137/545 |
| 4,015,613 A | | 4/1977 | Papworth | |
| 4,784,751 A | | 11/1988 | McGehee | |
| 4,787,348 A | | 11/1988 | Taylor | |
| 5,078,901 A | * | 1/1992 | Sparrow | 210/744 |
| 5,683,586 A | * | 11/1997 | Harcourt et al. | 210/695 |
| 5,888,399 A | * | 3/1999 | Rutledge et al. | 210/634 |
| 6,432,298 B1 | * | 8/2002 | Carvalko, Jr. | 210/86 |
| 6,596,174 B1 | * | 7/2003 | Marcus | 210/695 |

OTHER PUBLICATIONS

"ALGAE–X Cleans Diesel Fuel Filters & Tanks", ALGAE–X International (2000), pp. 1–4.*

"MTC–1000, Mobile Tank Cleaning System Operating Manual," ALGAE–X Int'l (May 6, 2002) pp. 1–20 Fort Myers Beach, FL.

* cited by examiner

Primary Examiner—Fred G. Prince
(74) Attorney, Agent, or Firm—Merchant & Gould

(57) ABSTRACT

A method for filtering algae, comprising receiving a generator shut-off signal indicating that a generator associated with a fuel tank having fuel has shut off; and upon receiving the generator shut-off signal, automatically filtering algae from the fuel. The method further comprises receiving a generator active signal indicating that the generator has been activated; and, upon receiving the generator active signal, ceasing filtering algae from the fuel. Algae is filtered from the fuel by way of an algae treatment unit and a filter assembly. A control module controls the filtering process and comprises an alarm operable for alerting someone in the event of a filtering problem. The system comprises a self-contained mobile system capable of on-site fuel reconditioning.

20 Claims, 3 Drawing Sheets

MOBILE DIESEL FUEL ENHANCEMENT UNIT AND METHOD

NOTICE OF COPYRIGHT PROTECTION

A portion of the disclosure of this patent document and its figures contain material subject to copyright protection The copyright owner has no objection to the facsimile reproduction by anyone of the patent document or the patent disclosure, but otherwise reserves all copyrights whatsoever.

BACKGROUND

1. Field of the Invention

This invention relates generally to the field of fuel treatment. More particularly, this invention relates to an on-site mobile diesel fuel enhancement unit and process for reconditioning contaminated diesel fuel in a fuel tank.

2. Description of the Related Art

Fuel contamination is a common problem that leads to costly service and repairs. Contaminants comprise water, oxides, microorganisms, dust, dirt, and other natural contaminants found in all diesel fuel. Just recently, one of the main sources of contamination has become algae. Algae effects not only diesel fuel, but gasoline as well. Diesel fuel has an average shelf life of about 6 months before microbial contamination takes its toll. Microorganisms, such as algae, bacteria, and fungus, feed on the oil in the fuel and use the water in the fuel for their oxygen supply. The use of cracked diesel fuel has lead to an increase in the amount of water in a tank. The use of low-sulfur diesel fuel promotes the growth of algae. Reducing the sulfur in the fuel also reduces the aromatic content of the fuel. Microorganisms use these aromatics as a source of food, and a reduction in aromatics forces the microorganisms to turn to other food supplies. Microorganisms growing in a fuel supply can lead to thousands of dollars in damage to a fuel tank and the machines powered by the fuel tank. The spread of the problem is very serious considering that a clean system can be contaminated by using a fuel nozzle connected to a contaminated tank. Clean diesel fuel can easily become contaminated during transportation and storage. As processed fuel is transferred from the manufacturer to the consumer, it may be stored in as many as five to ten different tanks before reaching the final consumer. Fuel is often filtered along the way, but the filtering is not effective enough. Contaminants must be removed immediately before the fuel enters the engine's filter system, so as not to damage the system. Engines demand very high quality fuel entering the cylinders in order to operate effectively and efficiently.

The contaminated fuel problem results in a build-up of a sludge or slime in the bottom of a fuel tank. The build-up of sludge can lead to the clogging of fuel filters and fuel system components, such as fuel injectors and pumps. Water in a fuel tank can also lead to serious problems, and algae clinging to the inside of a fuel tank will hold onto the water inside of a tank, making it impossible to drain the water out. Water is continuously being formed in a fuel tank as a result of condensation when a tank is not kept at full capacity. The process occurs both day and night. Water in a steel tank not only supplies the microorganisms with oxygen, but also may lead to rust problems and tank decay, causing further contamination problems. Aside from oxygen, microorganisms also require warm temperatures to flourish and grow. Cold temperatures will inhibit some growth, but will not kill the microorganisms. This is the reason why colder climates do not experience as significant a contamination problem. Cold winters lead to a very short growing season for the microorganisms. Some microorganisms, however, do have the ability to grow in cold temperatures. In cold climates, diesel fuel heaters are also used, giving the microorganisms the ability to grow all year long.

Machines running on severely contaminated fuel notice a drastic reduction in power and economy. Less sever contamination problems result in the same effects, but in less noticeable amounts. The reason for the power and economy reductions occurs because the microorganisms that clog the fuel pumps and injectors cause uneven spray patterns. Uneven spray patterns lead to incomplete burns in combustion chambers resulting in hot spots and a damaging accumulation of deposits.

To cure fuel supplies of their contamination problems, several conventional methods have been used. Washing the fuel tank has proven to be unsuccessful. Conventional filtration systems are not effective enough at removing unwanted particles and water from the fuel. Biocides are used, but must be used properly and are often unsuccessful. Biocides are consumed by the microorganisms and are effective at killing large amounts of them, but are only effective if there is enough poison in the tank to kill all of the microorganisms. Once all of the biocide has been consumed, the microorganisms will continue to grow. After the algae has been killed by the biocides, the algae falls to the bottom of the tank where it forms a sludge layer that feeds into the engine. Conventional primary fuel filters and fuel/water separators are typically spin-on type replaceable cartridges. Replaceable cartridges can be expensive and often require screen cleaning or replacement. Additives, especially those rich in nitrogen and phosphorous, aid microbial growth and accelerate the process of biodegradation. Biodegradation produces byproducts, such as hydrogen sulfides, biosurfactants, and bacterial slime. Hydrogen sulfides form extremely corrosive acids that damage fuel pumps, corrode tanks, and ruin injectors. Biosurfactants allow water to break down in the fuel, spreading microbial contamination. The slime that grows collects on tank walls and can clog filters, which can cause complete engine shutdown. All of the conventional techniques listed above require maintenance costs, the use of toxic biocides, and result in downtime.

What is needed is a system and method that eliminates the need and cost of toxic biocide treatments, costly tank cleanings, exposure to and accidents from hazardous biocides, fuel starvation due to algae and bacteria growth, and equipment malfunction. What is needed is a system and treatment method that reduces maintenance costs and downtime and protects machine components. What is needed is a system and method that reverses the process of sludge build-up, improves combustion, saves fuel, reduces carbon deposits, and reduces harmful emissions.

BRIEF SUMMARY OF THE INVENTION

The present invention is directed to novel a system and method for reconditioning diesel fuel in a fuel tank. The advantages of the fuel treatment method and system of the present invention include reversing the process of sludge build-up in a tank, preserving the integrity of stored fuel, improving fuel filterability, and enhancing oil/water separation. Further, the methods and systems of the present invention eliminate the need for fuel tank cleaning and the need and cost of toxic biocide cleanings. Non-hazardous treatment methods result in less pollution to the environment and minimize worries regarding regulatory compliance. Still further, the advantages include lower operating costs by extending the life of an engine, filters, injectors, pumps, fuel tanks, and all other fuel related parts. Engine efficiency, power, and reliability are increased because fuel lines and filters are not blocked or fouled due to contamination; maintenance costs and engine downtime are decreased. Also, the cleaner burn of the engine results in less pollution.

A method for automatically filtering algae from diesel fuel according to the present invention comprises receiving a generator "run" signal indicating that a generator associated with a fuel tank having fuel has started running, and, upon receiving the generator "run" signal, automatically shutting down the filtering mechanism. The method further comprises resuming filtering algae from the fuel upon cessation of the generator "run" signal.

In one embodiment, the method for automatically filtering algae from the fuel comprises pumping fuel through a filter assembly, comprising two fuel treatment mechanisms. The first mechanism comprises an algae treatment unit. The fuel is then pumped through a second mechanism, wherein the second mechanism comprises a fuel filter. The fuel filter may be of a conventional type and may include a water separator unit operable for separating water from the diesel fuel. Fuel that has passed through both the first and second fuel conditioning mechanisms is returned to the fuel tank where it is used by the associated generator. In the event of a system problem, an alarm is activated, stopping the filtering process and alerting a technician. Problems may comprise engine, reconditioning equipment, and filtering problems.

A system for automatically filtering algae, comprising a control module, an algae treatment unit, and a filter assembly. The control module is operable for receiving a generator shut-off signal indicating that a generator associated with a fuel tank having fuel has shut off; and, upon receiving the generator shutoff signal, automatically triggering the system to remove algae from the fuel. The control module is further operable for receiving a generator active signal indicating that the generator has been activated; and, upon receiving the generator active signal, triggering the apparatus to cease removing algae from the fuel.

The system further comprises a transfer pump operable for pumping fuel from the fuel tank through the algae treatment unit, filter assembly, and returning the fuel back to the fuel tank after automatically removing algae from the fuel. In one embodiment, a water separator is a component of the filtering assembly. In an alternative embodiment, the water separator is a separate component of the system. The water separator is operable for separating water from the fuel.

In one embodiment, the system is a mobile system capable of automatically filtering algae from the fuel tank on-site, such as in transportation, marine, and industrial applications.

Algae is removed from the diesel fuel by way of an anti-algae fuel conditioning unit producing a magnetic field by converting kinetic energy derived from fuel flow into electrical energy. The magnetic field is operable for breaking carbon into small particles where they are more easily filtered or are burned up by the engine along with the fuel.

In an additional embodiment, the system comprises a fuel analyzer operable for analyzing microorganism and sediment levels in a plurality of fuel samples.

The systems and methods of the present invention eliminate the need for costly removal of biocide waste, lower operating costs by extending the life of engine components, free filters and lines of blockage which reduce efficiency and power, reduce exhaust and smoke pollution, and reduce engine downtime.

BRIEF DESCRIPTION OF THE DRAWINGS

These and other features, aspects, and advantages of the mobile fuel reconditioning unit and processes are better understood when the following Detailed Description of the Invention is read with reference to the accompanying drawings, wherein.

DETAILED DESCRIPTION OF THE INVENTION

As required, detailed embodiments of the present invention are disclosed herein, however, it is to be understood that the disclosed embodiments are merely exemplary of the invention that may be embodied in various and alternative forms. Specific structural and functional details disclosed herein are not to be interpreted as limiting, but merely as a basis for the claims as a representative basis for teaching one skilled in the art to variously employ the present invention. Conventional hardware and systems are shown in block diagram form and process steps are shown in flowcharts.

Figure 1:
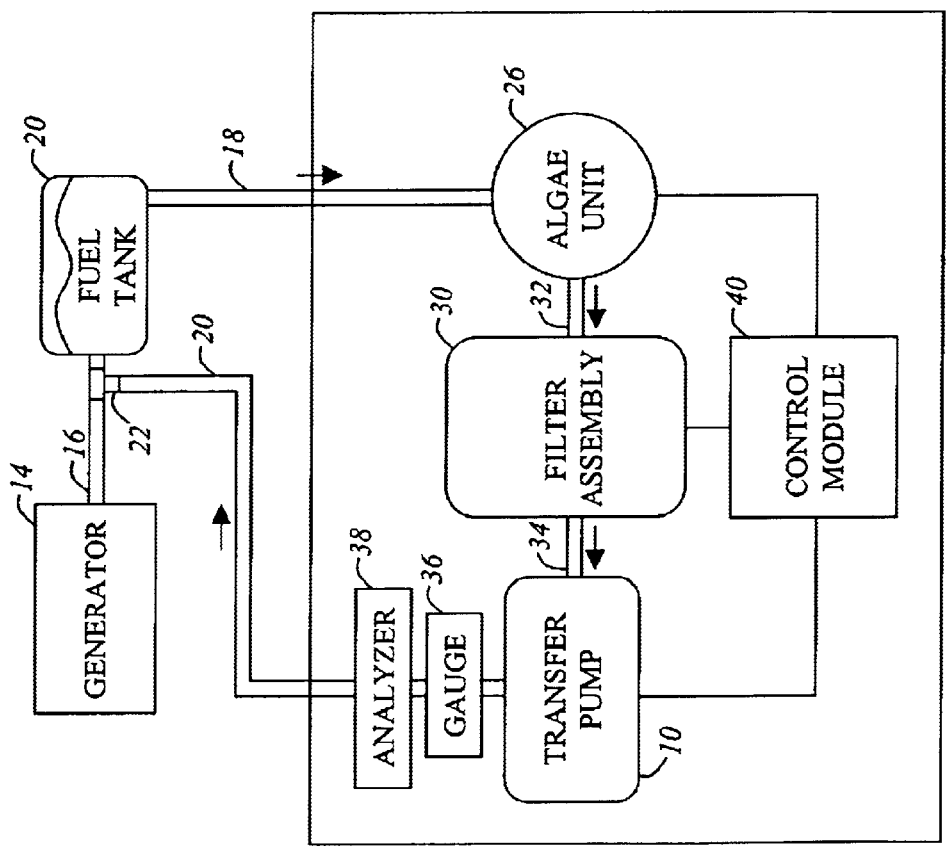
FIG. 1 is a schematic diagram of the self-contained diesel fuel reconditioning system in accordance with an exemplary embodiment of the present invention.

An embodiment of the fuel reconditioning system of the present invention is illustrated in FIG. 1. The self-contained system possesses the capability to connect directly to any engine or generator set and provide automatic fuel reconditioning without interrupting the operation of the engine or generator. In the embodiment shown in FIG. 1, the system comprises a fuel transfer pump 10 operable for pumping gasoline, diesel fuel or the like from a fuel tank 12 connected to the generator 14. The generator 14 is connected to the fuel tank 12 by supply line 16. The transfer pump 10 circulates fuel from the generator supply line 16, via an inlet line 18, through the reconditioning system, and returns it back to the fuel tank 12 via a return line 20. The inlet line 18 is connected to the fuel tank 12, preferably at the lowest point of the tank bottom. The inlet line 18 is placed at the bottom part of the tank in order to remove as much of the free water and sludge as possible. The return line 20 is connected to the generator supply line 16 at fitting 22. In one example, a T-fitting may be used to provide access to supply line 16. The T-fitting comprises a longitudinal passage and a branch passage intersecting the longitudinal passage midway along its length. The return line 20 connects to the T-fitting in a fluid-tight fashion to prevent leakage of fuel. In one example, the branch passage of the T-fitting is connected to its associated line by way of a manually disconnectable attachment mechanism, such as a quick-disconnect fitting.

An inlet of algae treatment unit 26 is connected to inlet line 18,. In a preferred embodiment, the inlet line 18 is comprised of a flexible hose to facilitate handling by its user. An outlet of the algae unit 26 is connected to an inlet of a filter assembly 30 by pipe 32. An outlet of the filter assembly 30 is connected to an inlet of the transfer pump 10 by pipe 34. An outlet of the transfer pump 10 is connected to return line 20, which returns reconditioned fuel to the fuel tank 12. As is the case with inlet line 18, return line 20 is comprised of a flexible hose to facilitate handling by its user. Return line 20 comprises a quick-disconnect fitting to facilitate its use. Inlet line 18 and return line 20 are flexible lines and are long enough to allow the reconditioning system to be used at a distance from the fuel tank 12. The algae unit 26, filter assembly/water separator 30, and transfer pump 10 are connected through pipes and elbow fittings. In one embodiment, the filter assembly comprises a water separator component. In an alternative embodiment, the water separator component is a unit separate from the filter assembly 30. The water separator is operable for separating water from the fuel. A pressure gauge 36 is connected to the outlet side of the pump 10 to sense the fluid pressure. The positioning of the transfer pump 10, algae unit 26, pressure gauge 36, and filter assembly 30 within the system may be interchanged depending upon flow rate.

The transfer pump 10 is operable for pumping fuel from the fuel tank through the algae unit 26, filter assembly 30, and returning the fuel back to the fuel tank 12 after automatically filtering algae from the fuel. The size of the fuel transfer pump 10 is dependent upon the size of the fuel tank to be cleaned. For example, a fuel tank containing approximately 5,000 gallons of diesel fuel connected to a fuel transfer pump 10 capable of handling 500 gallons/hour would require about 10 hours to recondition the fuel, depending upon the condition of the fuel. Heavily contaminated fuel may require the fuel to be run through the algae unit several times, taking approximately 50 hours to fully recondition.

The algae treatment unit 26 comprises a magnet operable for breaking microorganisms apart, allowing them to either be trapped in the filter assembly 30, or to pass through the filter assembly 30 and into the engine, where they are burned with the fuel. The magnet transfers kinetic energy, derived from the flow of the fuel, into electrical energy in the form of a magnetic field. This process is known as induction. The algae unit 26 induction of microorganisms disrupts the electrical balance over the cell membrane, effectively breaking down the cell membrane.

One example of an algae reconditioning unit is that produced by ALGAE-X®. The algae unit 26 cleans the total fuel system and reverses the process of sludge build-up. Since the unit is comprised of a magnet, it has no moving parts and is therefore maintenance free. The algae unit 26 dissolves tank sludge and prevents fuel filters from clogging and injectors from corroding The unit 26 is the main component in preserving the integrity of stored fuel, improving filterability, preventing tank cleaning, and enhancing oil/water separation. The unit 26 extends engine equipment life, lowers operating costs, maintenance and downtime, while increasing safety and reliability. As stated above, the algae unit 26 is disposed in the fuel treatment line between the transfer pump 10 and the fuel filter assembly 30. The algae unit 26 is also placed before any water separator assembly. The algae unit 26 itself does not significantly increase fuel restriction, however, the filter assembly 30 may increase restriction.

The filter assembly 30 is responsible for removing unwanted particles from the fuel, such as dirt, dust, water, and the broken-down carbon of the microorganisms. In one embodiment, the filter assembly 30 comprises a water separator on the bottom of the assembly which separates out water and brings it to the bottom of the filter where it is collected. In an alternative embodiment, the water separator is a component separate from the filter assembly 30. The filter assembly 30 allows an engine to run longer because it decreases carbon build-up inside the engine. The filter assembly includes one or more filters, depending upon flow rate. When a low flow rate is involved, one filter may be adequate. When dealing with a high flow rate, more than one filter may be necessary, for example, three or four filters may be required. In one embodiment, the filter assembly 30 is a unit separate from the algae unit 26. In an alternative embodiment, the filter assembly 30 and the algae unit 26 are combined together to form one unit.

In one embodiment, a fuel analyzer 38 may be connected to the reconditioning system. For example, the analyzer 38 may be inserted in the fuel cleaning line immediately before the fuel is returned to the fuel tank 12. By disposing the analyzer immediately before the tank 12, a sample of fuel is examined after the fuel has been subject to the entire reconditioning process. A conventional method for analyzing a sample of fuel comprises examining the color of the fuel sample. A sample having a bright and clear dark maroon color is typically a clean sample having optimal quality characteristics in terms of filterability and combustibility. A murky sample having a dark bluish tint is characteristic of a contaminated sample resulting from the formation of solids as the fuel ages in a tank. If a sample appears murky, this may indicate that the fuel has water in it. Sediment that can be seen floating on the top of the sample, or visible when held up to a light source, is also an indication of contamination. A sample that has been run through the algae unit 26 and the filter assembly 30 should appear dark maroon in color and be sediment-free. In one embodiment, the analyzer comprises a timing mechanism operable for analyzing samples at pre-determined time periods.

A control module 40 is operatively connected to the components of the system. The control module 40 is operable for receiving a generator shutoff signal indicating that a generator associated with a fuel tank having fuel has shut off; and, upon receiving the generator shut-off signal, automatically triggering the apparatus to filter algae from the fuel. The control module 40 is further operable for receiving a generator active signal indicating that the generator has been activated; and, upon receiving the generator active signal, triggering the apparatus to cease filtering algae from the fuel. The control module 40 comprises an alarm that is activated in the event of a fuel reconditioning problem or an engine problem.

Figure 2:
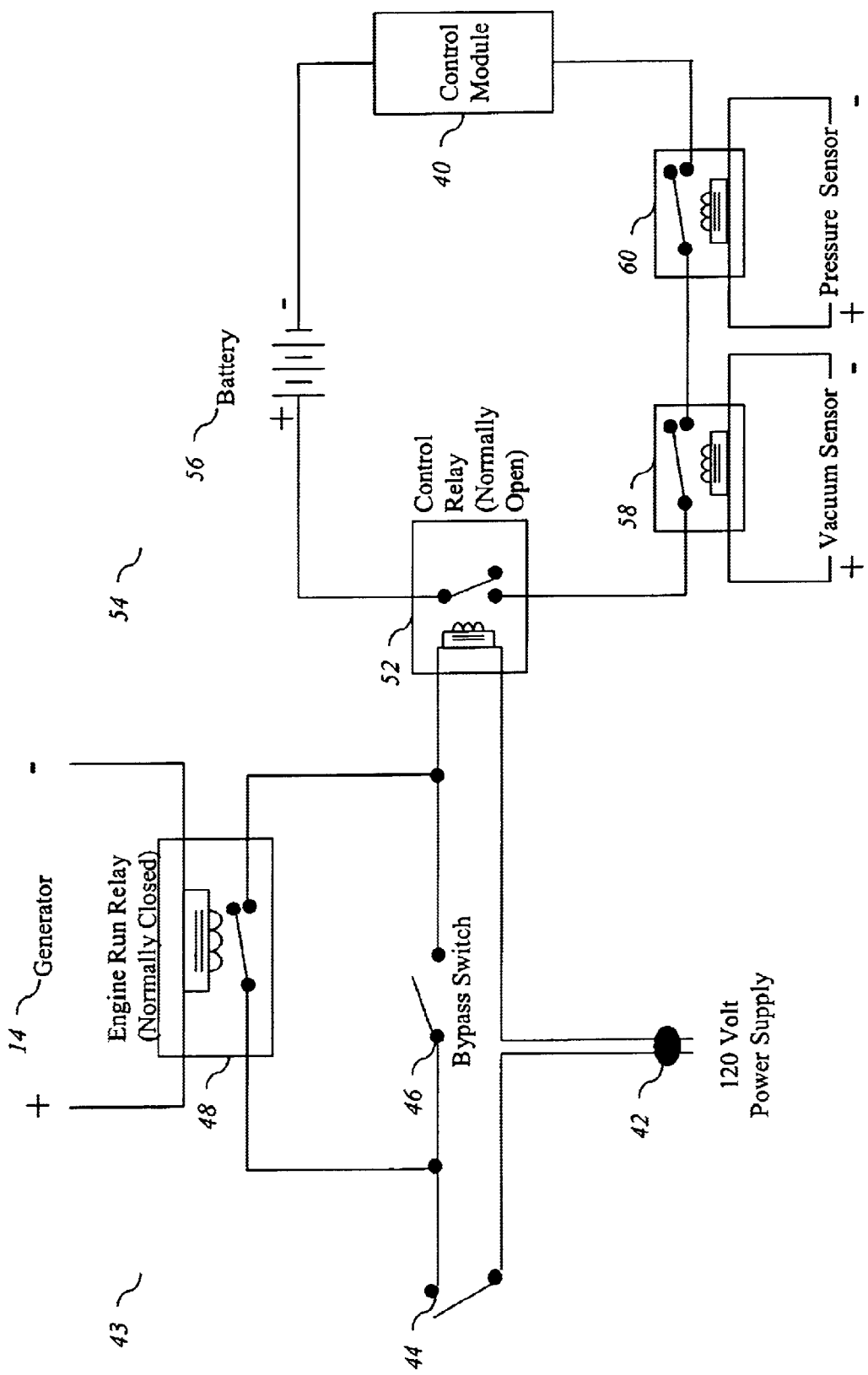
FIG. 2 is a wiring diagram of the control module of the diesel fuel reconditioning system of FIG. 1 in accordance with an exemplary embodiment of the present invention.

Referring to FIG. 2, in the embodiment shown, a 120-volt power supply 42 provides electricity to a control circuit 43. The control circuit also includes a first switch 44. When switch 44 is closed, electricity flows through the control circuit 43. The control circuit 43 shown in FIG. 2 also includes a bypass switch 46. The bypass switch 46 allows the circuit 43 to be closed regardless of the condition of the engine run relay 48.

The engine run relay 48 is a normally-closed relay. When the engine is on, an electrical source powered by the engine, such as an alternator or generator, supplies power to the relay 48 and opens the circuit 43. If the bypass switch 46 is open, no current flows through the circuit 43. When the engine stops running, the power supply to the engine run relay 48 stops, and the switch closes. When this happens, electricity flows through the control circuit 43, regardless of the state of the bypass switch 46.

The control circuit 43 shown in FIG. 2 also includes a control relay 52. The control relay 52 is a normally open relay that controls power to a second circuit 53. The second circuit provides power to the control module 40 described in relation to FIG. 1. When power is supplied to the control relay 52, the switch closes and power is supplied to the control module circuit 53.

The control module circuit 53 in the embodiment shown includes various other components as well. Power is supplied to the control module 40 by a battery 54. Also, two additional relays determine whether the control module is supplied with power. The vacuum sensor relay 56 and pressure sensor relay 58 are normally open relays. They remain closed as long as sufficient vacuum and pressure, respectively, are present in the system. If a problem occurs in the filtering system due to vacuum or pressure, the corresponding relay opens, and no electricity flows to the control module. In other embodiments, various other types of sensors may be installed in the control circuit to ensure proper operation.

The circuits 41, 53 shown in FIG. 2 may be utilized in various ways. For example, if switch 44 is open, no electricity will flow to the control module, regardless of the state of the generator 14, bypass switch 46, vacuum sensor 56, or pressure sensor 58. If switch 44 is closed and bypass switch 46 is closed, electricity flows through circuit 41 and causes the control relay 52 to close. If the switches in the sensor relays 56, 58 remain closed, electricity flows to the control module. Likewise, if the generator 14 stops running and the switch in the engine run relay closes, then if the switches in the sensor relays 56, 58 remain closed, electricity flows to the control module.

Automatic operation occurs by way of the control module 40. Fuel reconditioning occurs when the attached generator 14 is not running. If the generator 14 starts up, the engine run relay 48 is activated, and this relay shuts down the pump by shutting off power to the control relay 52.

In the operation of this system, the transfer pump 10 shown in FIG. 1 receives a turn on signal from the control module 40. As stated above, the control module 40 is operable for receiving an engine, such as a generator engine, shut-off signal indicating that a generator associated with a fuel tank having fuel has shut off; and, upon receiving the generator shut-off signal, automatically triggering the transfer pump 10 to begin pumping fuel. The control module 40 is further operable for receiving a generator active signal indicating that the generator has been activated; and, upon receiving the generator active signal, triggering the transfer pump 10 to cease pumping fuel. When the generator 14 is not activated, the fuel is being circulated through the algae unit 26 and the filter assembly 30 time and time again. In one example, it may take about 16 to about 30 hours to ensure complete fuel reconditioning. After this time, the fuel is considered contaminant-free and returned back to its original state, where it can be used to power the generator 14.

Figure 3:
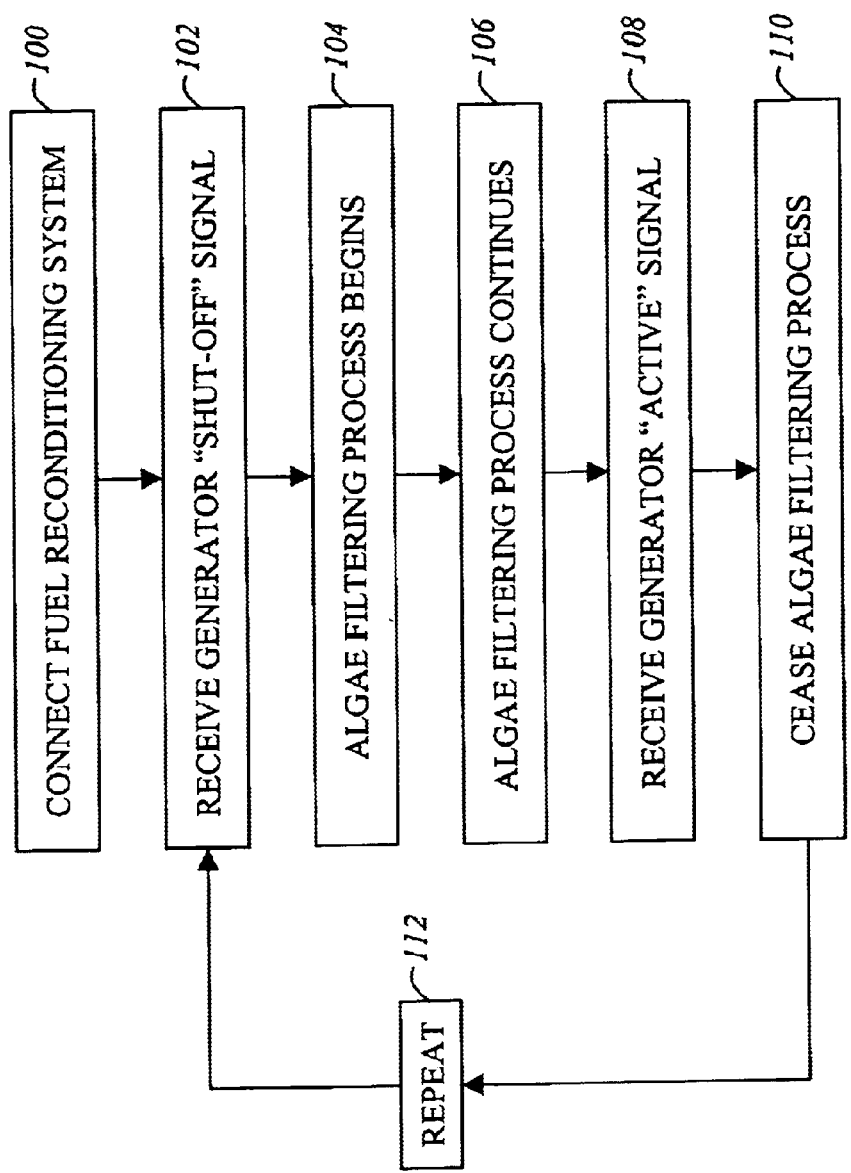
FIG. 3 is a flow diagram for an automatic method for filtering algae from diesel fuel in accordance with an exemplary embodiment of the present invention.

Referring to FIG. 3, when the reconditioning system of the present invention is to be employed, one connects the system's inlet 18 and return lines 20 lines to the generator's fuel tank (Step 100), while making sure that no leakage occurs and also preventing air from entering the fuel system. As stated above, the inlet line 18 and return line 20 may be connected by means of quick-connect mechanism. Power supply cables are connected to the proper power means, such as a DC 12-volt battery or a 120-volt outlet.

When the control module 40 receives a generator shut-off signal (Step 102) indicating that the generator associated with the fuel tank has shut off, the algae filtering process begins (Step 104). The reconditioning process persists (Step 106) until the control module 40 receives a generator active signal (Step 108) indicating that the generator has been activated; and, upon receiving the generator active signal, the control module 40 shuts-down the pump 10 and ceasing filtering algae from the fuel (Step 110). When the control module 40 receives another generator shut-off signal, the filtering process begins again (Step 112) until another generator active signal is received. In the event of a problem occurring at any point during the process, such as a generator problem, system equipment failure, or a filtering problem, the alarm is activated and an alarm signal is sent to a monitoring station.

The system and method of the present invention greatly increases engine filter life. A conventional filter in an untreated system typically can be run for about 40 hours, and then must be replaced. The same conventional filter used in the treated system of the present invention typically runs for at least about 1000 hours. This leads to filter cost savings and less down time as a result of less maintenance. In an engine comprising multiple filters, for example large engines comprising 7 or 8 filters, a great deal of time and money can be saved by not having to change filters as often. Fuel injector lifespan is also greatly increased. Conventional V16 engines comprise 16 injectors, which can amount to very expensive replacement costs.

In one embodiment, the fuel reconditioning system may be connected to a mobile cart comprising wheels, such as a hand-truck. The mobile cart allows fuel to be reconditioning on-site. The cart comprises a metal frame comprising a plate on which all of the components of the system are mounted, such as the transfer pump 10, algae unit 26, filter assembly 30, control module, water separator, electrical cords, the plurality of fuel lines, and a power source. On-site reconditioning is important for many types of applications. For transportation uses, such as trucking, buses, trains, and automobiles, treated fuel burns more efficiently and provides greater power and increased gas mileage. The reconditioning system may be used in marine applications, such as commercial fishing, recreational boating, and military vessels to improve engine performance and increase gas mileage. The system has many standby power and fuel storage industry applications including emergency centers, fueling stations, fuel containment areas in engine rooms, and storage tanks. Lastly, the system may be used in many other industrial application such as manufacturing plants and in any application using diesel fuel.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A method for filtering algae, comprising:
    receiving a generator shut-off signal indicating that a generator associated with a fuel tank having fuel has shut off; and
    upon receiving the generator shut-off signal, automatically filtering algae from the fuel.

2. The method of claim 1, wherein automatically filtering algae from the fuel comprises pumping fuel through a first treatment unit.

3. The method of claim 2, wherein the first filter comprises an algae treatment unit.

4. The method of claim 2, wherein automatically filtering algae from the fuel comprises pumping fuel through a second filter.

5. The method of claim 4, wherein the second filter comprises a fuel filter.

6. The method of claim 1, further comprising returning the fuel to the tank after automatically filtering algae from the fuel.

7. The method of claim 6, further comprising receiving a generator active signal indicating that the generator has been activated; and, upon receiving the generator active signal, ceasing filtering algae from the fuel.

8. The method of claim 1, further comprising activating an alarm in the event of a problem.

9. The method of claim 8, wherein the problem comprises at least one of the following: an engine problem, a reconditioning problem, and a filtering problem.

10. The method of claim 1, further comprising manually filtering algae from the fuel.

11. A system for automatically filtering algae, comprising:

a control module;

an algae treatment unit; and a filter assembly;

wherein the control module is operable for receiving a generator shut-off signal indicating that a generator associated with a fuel tank having fuel has shut off; and, upon receiving the generator shut-off signal, automatically triggering the apparatus to filter algae from the fuel; and wherein the control module is operable for receiving a generator active signal indicating that the generator has been activated; and, upon receiving the generator active signal, triggering the apparatus to cease filtering algae from the fuel.

12. The system of claim 11, further comprising:

a transfer pump;

wherein the transfer pump is operable for pumping fuel from the fuel tank through the algae treatment unit, filter assembly, and returning the fuel back to the fuel tank after automatically filtering algae from the fuel.

13. The system of claim 11, further comprising:

a water separator;

wherein the water separator is operable for separating water from the fuel.

14. The system of claim 11, wherein the system may be operated in a manual mode.

15. The system of claim 11, wherein the system is a mobile system capable of automatically filtering algae from the fuel tank on-site.

16. The system of claim 11, wherein the algae treatment unit produces a magnetic field by converting kinetic energy derived from fuel flow into electrical energy.

17. The system of claim 11, wherein the magnetic field is operable for breaking carbon into small particles.

18. The system of claim 11, wherein the control module comprises an alarm that is activated in the event of a fuel reconditioning problem.

19. The system of claim 11, further comprising:

a plurality of electrical connection cords.

20. The system of claim 11, further comprising:

a fuel analyzer, wherein the fuel analyzer is operable for analyzing microorganism and sediment levels in a fuel sample.

* * * * *

UNITED STATES PATENT AND TRADEMARK OFFICE
CERTIFICATE OF CORRECTION

PATENT NO. : 6,702,948 B1
DATED : March 9, 2004
INVENTOR(S) : Oberlander

It is certified that error appears in the above-identified patent and that said Letters Patent is hereby corrected as shown below:

Column 3,
Line 6, delete "bum" and insert -- burn -- in place thereof.

Column 10,
Line 25, delete "," and insert -- ; -- in place thereof.

Signed and Sealed this

Twenty-first Day of December, 2004

JON W. DUDAS
*Director of the United States Patent and Trademark Office*